United States Patent
Nakai

(10) Patent No.: US 7,656,913 B2
(45) Date of Patent: Feb. 2, 2010

(54) FIBER PULSE LASER APPARATUS AND METHOD OF CONTROLLING THE SAME

(75) Inventor: Michihiro Nakai, Sakura (JP)

(73) Assignee: Fujikura Ltd., Tokyo (JP)

(*) Notice: Subject to any disclaimer, the term of this patent is extended or adjusted under 35 U.S.C. 154(b) by 192 days.

(21) Appl. No.: 12/017,748

(22) Filed: Jan. 22, 2008

(65) Prior Publication Data

US 2008/0175287 A1    Jul. 24, 2008

(30) Foreign Application Priority Data

Jan. 23, 2007   (JP) .............................. 2007-012546

(51) Int. Cl.
*H01S 3/10*   (2006.01)
*H01S 3/30*   (2006.01)
*H01S 3/11*   (2006.01)
*H01S 3/13*   (2006.01)

(52) U.S. Cl. ................... 372/25; 372/6; 372/10; 372/26; 372/29.02

(58) Field of Classification Search .............. 372/6, 372/10, 25–26, 29.02

See application file for complete search history.

(56) References Cited

U.S. PATENT DOCUMENTS

| | | | |
|---|---|---|---|
| 7,340,135 B2* | 3/2008 | Okuno ....................... | 385/122 |
| 7,430,352 B2* | 9/2008 | Di Teodoro et al. ......... | 385/123 |
| 7,505,196 B2* | 3/2009 | Nati et al. .................... | 359/333 |
| 2006/0159138 A1* | 7/2006 | Deladurantaye et al. ...... | 372/25 |
| 2008/0310859 A1* | 12/2008 | Cai ............................. | 398/160 |
| 2009/0080467 A1* | 3/2009 | Starodoumov et al. ......... | 372/6 |

FOREIGN PATENT DOCUMENTS

| | | |
|---|---|---|
| JP | 7-74422 A | 3/1995 |
| JP | 2658351 B2 | 6/1997 |
| JP | 3364171 B2 | 10/2002 |
| JP | 3411852 B2 | 3/2003 |
| JP | 2004-337970 A | 12/2004 |

* cited by examiner

*Primary Examiner*—Minsun Harvey
*Assistant Examiner*—Phillip Nguyen
(74) *Attorney, Agent, or Firm*—Sughrue Mion, PLLC

(57) ABSTRACT

A method of controlling a pulse output in a master oscillator-power amplifier type fiber pulse laser apparatus including a master oscillator unit and a power amplifier unit connected to the master oscillator unit is provided. The method includes starting the master oscillator unit before starting the power amplifier unit.

8 Claims, 1 Drawing Sheet

FIBER PULSE LASER APPARATUS AND METHOD OF CONTROLLING THE SAME

CROSS-REFERENCE TO RELATED PATENT APPLICATIONS

Priority is claimed from Japanese Patent Application No. 2007-12546, filed on Jan. 23, 2007 in the Japanese Patent Office, the entire disclosure of which is incorporated herein by reference.

BACKGROUND OF THE PRESENT INVENTION

1. Field of the Present Invention

Apparatuses and methods consistent with the present invention relate to a fiber pulse laser apparatus, and more particularly, to a method of controlling pulse outputs of the fiber pulse laser apparatus such that a first pulse output is equalized in magnitude with second and subsequent pulse outputs in a pulse laser that oscillates pulses through a combination of a master oscillator and an optical amplifier (hereinafter, referred to as an MO-PA type laser apparatus), and a fiber pulse laser apparatus that controls a pulse output according to the control method.

2. Description of Related Art

In the related art, for example, MO-PA type laser apparatuses are disclosed in various documents.

Among these disclosures, Japanese Patent No. 2658351 discloses a technique for controlling a strength ratio of a peak value of a first pulse to each of peak values of second and subsequent pulses for wafer marking.

Japanese Unexamined Patent Application, First Publication No. H7-74422 discloses a technique for monitoring a population inversion state of an oscillator and oscillating pulses, with a low Q value of only a first pulse, based on the monitored population inversion state.

Japanese Patent No. 3411852 discloses a technique for operating an excitation light source into an idle state to keep the magnitude of a first pulse constant.

Japanese Patent No. 3364171 discloses a technique for slowing a marking speed accordingly to match with a smaller first pulse to make printed characters uniform.

Japanese Unexamined Patent Application, First Publication No. 2004-337970 discloses a technique for shortening a rising time by increasing the current of an excitation light source at the start-up of the light source.

In MO-PA type laser apparatuses, a laser output depends generally on an output of an excitation light source, such as a laser diode (LD) of a power amplifier (PA) unit (hereinafter referred to as a pump LD). If an output of the pump LD is zero, the laser output is zero even though the master oscillator (MO) unit oscillates pulses. In addition, when a trigger signal is input to a Q switch of the MO unit, Q switch pulses are generated in synchronization with the trigger signal.

In general, MO-PA type laser apparatuses have a disadvantage in that outputs of first several pulses become small immediately after the laser is started with pulse operation. On the contrary, other types of laser oscillators that do not employ MO-PA type have a different disadvantage in that only the first pulse is increased.

The present invention addresses a disadvantage relating to an output of a first pulse in an MO-PA type laser apparatus. The cause of the disadvantage of the first pulse in the MO-PA type laser apparatus is a slow start-up time of the PA unit. For example, although an interval between a pulse and a next pulse operated at 20 kHz is 50 µs, it takes between 200 microseconds and 500 microseconds until an amplifier reaches a completely stable operation at start-up. During this time, pulses become small in energy and peak value.

In addition, although the MO unit can start slightly earlier than the PA unit, if the start-up time is shortened, the start-up time of the MO unit may cause disadvantages in that the start-up time of the MO unit may present a bottleneck, thereby making it difficult to obtain any advantages from a reduction in the start-up time.

In the related art, an operation control at start-up of a pump LD is directed to reduce a delay time which may occur when the pump LD supplies excited light (see Japanese Patent No. 3364171 and Japanese Patent Application, First Publication No. 2004-337970), which is also an object of the present invention. This related-art technique cannot provide a solution to the essential problem that it takes a long time for the LD to produce a desired output and stabilize a population inversion of an amplification medium, thus giving no advantages with respect to the following points:

To make the pulse peak value constant from "first pulse" under all operation conditions.

To reduce the start-up time of the MO unit.

In addition, the advantages of the above related-art technique are inferior to the advantages of the present invention regarding minimization of the time until an output is stabilized.

SUMMARY OF THE PRESENT INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An object of the present invention is to provide a pulse output control method of a fiber pulse laser apparatus which is capable of making a pulse output constant from a first pulse.

To achieve the above object, a first aspect of the present invention is directed to a method of controlling a pulse output in a master oscillator-power amplifier type fiber pulse laser apparatus including a master oscillator unit and a power amplifier unit connected to the master oscillator unit, the method including performing a sequence of: starting the master oscillator unit before starting the power amplifier unit; and changing an operation of the master oscillator unit from a pulse operation to a continuous oscillation operation upon the starting of the power amplifier unit.

In the above-described method, the sequence may further include equalizing an output of an excitation light source for the power amplifier unit during the continuous oscillation operation in synchronization with a trigger signal at the end of the continuous oscillation operation; and adjusting the output of the excitation light source for the power amplifier unit to a desired output while returning to the pulse operation.

A second aspect of the present invention is directed to a master oscillator-power amplifier type fiber pulse laser apparatus including a master oscillator unit and a power amplifier unit connected to the master oscillator unit, the apparatus including a controller that controls a pulse laser output using the pulse output control method described above.

The control method of exemplary embodiments of the present invention enables acceleration of an increase in the population inversion of the amplification medium in the amplifier, as shown in FIG. 2.

In addition, according to aspects of exemplary embodiments of the present invention, as shown in FIG. 1, since the first pulse can be equalized in magnitude with the second and subsequent pulses, an optical amplifier or a fiber laser that employs the control method of the present invention can stabilize a pulse output.

In addition, in exemplary embodiments of the present invention, it is possible to operate the laser apparatus with the same sequence in any of these cases, without requiring a complicated pulse control, and to stabilize the pulse output, without an increase in the apparatus costs.

DETAILED DESCRIPTION OF THE PRESENT INVENTION

Exemplary embodiments of the present invention employ the following configurations to minimize the time until a first pulse is output, with a peak value of a pulse being constant or controlled at a laser start-up.

(1) It is configured such that a pulse from an MO unit is generated by a combination of a continuous wave (CW) laser and an external optical modulator or Q-switch laser with an internal optical modulator to keep the MO unit in an oscillating state before a pump LD of a PA unit starts.

The following explanation is for a Q-switch MO, however similar operation is possible for a CW MO with an external modulator.

This configuration allows an output of the laser to be obtained when the pump LD of the PA unit starts.

(2) Upon triggering the laser start-up, the pump LD unit of the PA unit is energized and an output of the LD is started. At this time, pulse oscillation is stopped with a constant Q value of the MO unit. In order to stop the pulse laser, the laser may transition into a CW mode or its output may be set to zero. As a result, no pulse signal is input to the PA unit for a specified period of time. During this period of time, a population inversion inside a fiber for amplification of the PA unit is increased.

(3) Assuming the period of a desired pulse operation is T seconds, after the MO unit transitions into the CW mode (or the output is stopped), the Q value of the MO unit is varied for a specified period of time and the MO unit is returned to the pulse operation through a Q switch operation. At the same time, the pump LD of the PA unit is properly adjusted to a desired output.

The specified period of time is determined based on the magnitude of the CW output from the MO unit and the intensity of driving current of the pump LD.

When the MO unit is operating in the CW mode, the output of the pump LD may have any value to raise the population inversion of an amplification medium (fiber) of the PA unit, but the value is preferably greater than an output during a normal operation. If the output of the pump LD is smaller than the output during the normal operation, the desired extent of the population inversion may not be obtained due to an influence of spontaneous emission.

Figure 1:
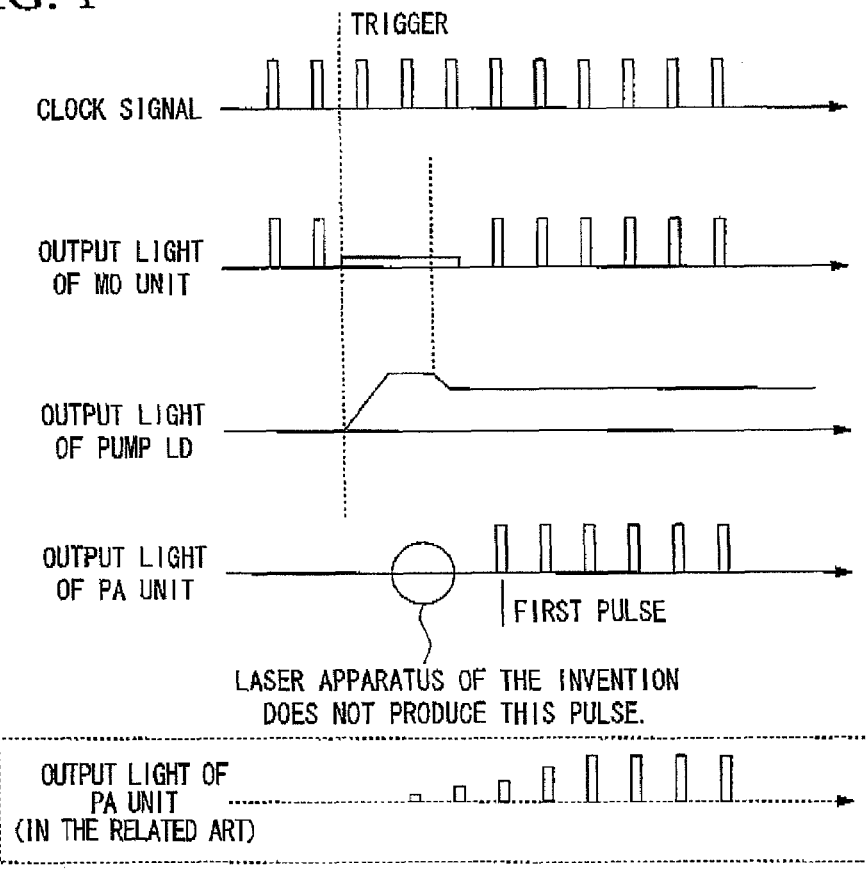
FIG. 1 is a timing chart showing an example of a control method according to an exemplary embodiment of the present invention.

FIG. 1 shows a timing chart illustrating the operations described in the above (1) to (3).

The peak value of the first pulse in the MO-PA type laser apparatus tends to be necessarily decreased as compared to peak values of second and subsequent pulses. This is because the population inversion of the amplification medium used in the PA unit is not sufficiently raised at an initial stage of laser oscillation. Accordingly, in order to control the peak value of the first pulse, it is important to keep the population inversion of the amplification medium of the PA unit constant from the first pulse. In addition, by starting up the MO unit before starting the PA unit, it is necessary to make it possible to determine a pulse peak value using only the population inversion of the amplification medium (fiber) of the PA unit.

However, in the pulse oscillation operation, the desired population inversion state is varied depending on the desired average output, pulse frequency and the like. Accordingly, without monitoring every population inversion state of the amplification medium and in order to equalize the first pulse in magnitude with the second and subsequent pulses under any conditions, it is required that the MO unit continue to make the CW oscillation until the amplification medium reaches a constant, and transition into a pulse operation after the CW oscillation is stabilized.

At this time, if uniformizing the first pulse with the second and subsequent pulses is more important, it is preferable that the CW output be as great as possible, that an operation condition (driving current) of the pump LD have a value from which a desired output can be obtained, and that the CW operation time be as long as possible.

On the other hand, if minimizing the pulse rising time is more important, it is preferable that the CW output be as small as possible, that the operation condition of the pump LD have a value greater than the value from which the desired output can be obtained, and that the CW operation time be as short as possible.

In either case, the magnitude of the first pulse becomes closer to the magnitude of the second and subsequent pulses and the pulse rising time is shortened as compared to when the fiber pulse laser apparatus does not employ the control method of exemplary embodiments of the present invention.

Figure 2:
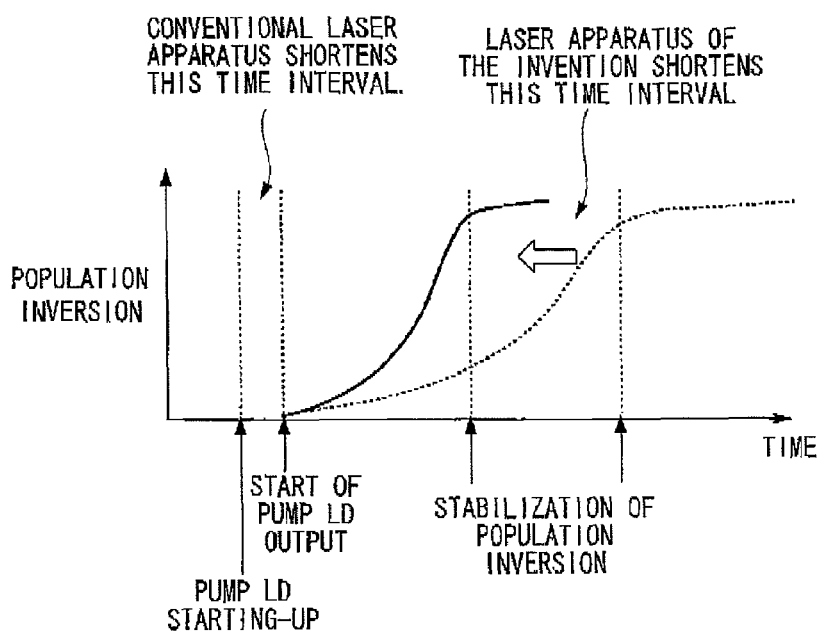
FIG. 2 is a graphical view showing an outline of a control method according to an exemplary embodiment of the present invention.

The control method of exemplary embodiments of the present invention enables acceleration of an increase in the population inversion of the amplification medium in the amplifier, as shown in FIG. 2.

In addition, according to an aspect of the present invention, as shown in FIG. 2, since the first pulse can be equalized in magnitude with the second and subsequent pulses, an optical amplifier or a fiber laser that employs the control method of exemplary embodiments of the present invention can stabilize a pulse output.

In addition, in exemplary embodiments of the present invention, it is possible to operate the laser apparatus with the same sequence in any of these cases, without requiring a complicated pulse control, and to stabilize the pulse output without an increase in the apparatus costs.

Although the method of controlling pulses such that the first pulse is equalized in magnitude (energy) with the second and subsequent pulses has been illustrated in the above, this method may be used to easily control only the first pulse to have any magnitude. In other words, it is possible to make the energy of the first pulse greater or smaller than that of the second and subsequent pulses.

EXAMPLE 1

In a fiber laser that can obtain an average laser output of 10 W when the excitation power of a PA is 30 W and when the CW output of an MO is 0 mW (no output) with the PA excitation power of 30 W in the CW operation, the time (in the unit of μs) taken until a first pulse is equalized in magnitude with second and subsequent pulses after a pump LD outputs a power of 30 W was examined. Table 1 shows the results.

TABLE 1

| Repetition frequency | Time taken to output first pulse |
|---|---|
| 100 kHz | 30 μs |
| 50 kHz | 70 μs |
| 30 kHz | 100 μs |
| 20 kHz | 180 μs |

In this example, when a Q switch pulse operation started after the MO maintained a CW output of 0 mW for only the time shown in Table 1, the first pulse was equalized in magnitude with the second pulse (with the margin of error of ±5%).

The result shown in Table 1 was empirically obtained based on the excitation power of the PA unit, the CW output of the MO unit, and a desired output.

EXAMPLE 2

Using the same fiber laser as Example 1, the same control as Example 1 was carried out to equalize the first pulse in magnitude with the second and subsequent pulses under an operation condition of an average output of 15 W. Similarly to Example 1, when the CW output of the MO is 0 mW with the PA excitation power of 30 W, the time (in the unit of μs) taken to output the first pulse was examined. Table 2 shows the results.

TABLE 2

| Repetition frequency | Time taken to output first pulse |
|---|---|
| 100 kHz | 15 μs |
| 50 kHz | 35 μs |
| 30 kHz | 50 μs |
| 20 kHz | 90 μs |

The first pulse output after elapse of the time shown in Table 2 was substantially equalized in magnitude with the second pulse.

From the comparison between Example 1 and Example 2, it can be seen that the average output in the normal operation is in proportion to the time taken to output the first pulse.

If the CW output, which was set to be 0 mW in Examples 1 and 2, was increased to 10 mW or above, the time taken to output the first pulse becomes one to three times as long as the time in the case of 0 mW, thereby prolonging the time taken to raise the output of the laser. However, since the time taken may be a few seconds, as long as it exceeds the lower limit value, it is possible to simplify the control operation to obtain the first pulse stably.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims and their legal equivalents.

The invention claimed is:

1. A method of controlling a pulse output in a master oscillator-power amplifier type fiber pulse laser apparatus comprising a master oscillator unit and a power amplifier unit connected to the master oscillator unit, the method comprising performing a sequence of:
   starting the master oscillator unit before starting the power amplifier unit; and
   changing an operation of the master oscillator unit from a pulse operation to a continuous oscillation operation upon the starting of the power amplifier unit.

2. The method according to claim 1, further comprising:
   equalizing an output of an excitation light source for the power amplifier unit during the continuous oscillation operation in synchronization with a trigger signal at the end of the continuous oscillation operation; and
   adjusting the output of the excitation light source for the power amplifier unit to a desired output while returning to the pulse operation after the end of the continuous oscillation operation.

3. The method according to claim 1, wherein the continuous oscillation operation continues until a population inversion of an amplification medium in the power amplifier unit reaches a constant.

4. The method according to claim 2, wherein the continuous oscillation operation continues until a population inversion of an amplification medium in the power amplifier unit reaches a constant.

5. A master oscillator-power amplifier type fiber pulse laser apparatus, comprising:
   a master oscillator unit;
   a power amplifier unit connected to the master oscillator unit; and
   a controller that controls a pulse laser output using the pulse output control method according to claim 1.

6. A master oscillator-power amplifier type fiber pulse laser apparatus, comprising:
   a master oscillator unit;
   a power amplifier unit connected to the master oscillator unit; and
   a controller that controls a pulse laser output using the pulse output control method according to claim 2.

7. A master oscillator-power amplifier type fiber pulse laser apparatus, comprising:
   a master oscillator unit;
   a power amplifier unit connected to the master oscillator unit; and
   a controller that controls a pulse laser output using the pulse output control method according to claim 3.

8. A master oscillator-power amplifier type fiber pulse laser apparatus, comprising:
   a master oscillator unit;
   a power amplifier unit connected to the master oscillator unit; and
   a controller that controls a pulse laser output using the pulse output control method according to claim 4.

* * * * *